US009559947B2

(12) United States Patent
Bottari et al.

(10) Patent No.: US 9,559,947 B2
(45) Date of Patent: Jan. 31, 2017

(54) RECOVERY IN CONNECTION-ORIENTED NETWORK

(75) Inventors: Giulio Bottari, Leghorn (IT); Diego Caviglia, Vallingby (SE); Daniele Ceccarelli, Genoa (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/394,140

(22) PCT Filed: Apr. 13, 2012

(86) PCT No.: PCT/EP2012/056811
§ 371 (c)(1),
(2), (4) Date: Feb. 7, 2015

(87) PCT Pub. No.: WO2013/152806
PCT Pub. Date: Oct. 17, 2013

(65) Prior Publication Data
US 2015/0215200 A1     Jul. 30, 2015

(51) Int. Cl.
*H04L 12/703*    (2013.01)
*H04Q 3/00*    (2006.01)
(Continued)

(52) U.S. Cl.
CPC ........... *H04L 45/28* (2013.01); *H04L 41/0663* (2013.01); *H04L 41/0681* (2013.01); *H04L 45/22* (2013.01);
(Continued)

(58) Field of Classification Search
CPC ...... H04L 45/28; H04L 45/22; H04L 41/0681; H04L 45/50; H04L 45/42; H04L 41/0663; H04L 12/24; H04Q 3/0079
See application file for complete search history.

(56) References Cited

U.S. PATENT DOCUMENTS

| 5,537,532 | A | * | 7/1996 | Chng | .................. H04L 41/0663 |
| | | | | | 714/4.2 |
| 2011/0038253 | A1 | * | 2/2011 | Yabusaki | ................ H04L 45/02 |
| | | | | | 370/217 |

(Continued)

OTHER PUBLICATIONS

PCT International Search Report, mailed Jun. 12, 2012, in connection with International Application No. PCT/EP2012/056811, all pages.
(Continued)

*Primary Examiner* — Afshawn Towfighi
*Assistant Examiner* — Lakeram Jangbahadur
(74) *Attorney, Agent, or Firm* — Leffler Intellectual Property Law, PLLC

(57) ABSTRACT

Recovery from failure of a working path for communications traffic in a connection-oriented network, where the working path has a preplanned recovery path, involves initiating recovery by requesting computation of a new recovery path for the communications traffic to avoid the failure. If the recovery is not successful within a time limit, recovery is carried out using the preplanned recovery path. Determining if the recovery is not successful and initiating the recovery using the preplanned recovery path can be controlled by an ingress node of the working path. By trying to compute a new recovery path first, network resources can be used more efficiently, as the new recovery path is likely to reuse most of the working path, since it is computed knowing the location of the fault.

17 Claims, 14 Drawing Sheets

(51) Int. Cl.
H04L 12/717 (2013.01)
H04L 12/24 (2006.01)
H04L 12/723 (2013.01)
H04L 12/707 (2013.01)

(52) U.S. Cl.
CPC .............. *H04L 45/42* (2013.01); *H04L 45/50* (2013.01); *H04Q 3/0079* (2013.01)

(56) References Cited

U.S. PATENT DOCUMENTS

| | | | | |
|---|---|---|---|---|
| 2011/0090785 A1* | 4/2011 | Shimizu | ............. | H04L 12/5695 370/218 |
| 2012/0188867 A1* | 7/2012 | Fiorone | .................. | H04L 45/00 370/218 |

OTHER PUBLICATIONS

Papadimitriou, D. et al. "Analysis of Generalized Multi-Protocol Label Switching (GMPLS)-based Recovery Mechanisms (including Protection and Restoration)" Network Working Group RFC 4428, The Internet Society, Mar. 2006, pp. 1-47.

Lang, J. P. et al. "RSVP-TE Extensions in Support of End-to-End Generalized Multi-Protocol Label Switching (GMPLS) Recovery" Network Working Group RFC 4872, The Internet Society, May 2007, pp. 1-47.

Berger, L. et al. "GMPLS Segment Recovery" Network Working Group RFC 4873, The IETF Trust, May 2007, pp. 1-25.

Mannie, E. et al. "Recovery (Protection and Restoration) Terminology for Generalized Multi-Protocol Label Switching (GMPLS)" Network Working Group RFC 4427, The Internet Society, Mar. 2006, pp. 1-22.

Berger, L. "Generalized Multi-Protocol Label Switching (GMPLS) Signaling Functional Description" Network Working Group RFC 3471, The Internet Society, Jan. 2003, pp. 1-34.

Papadimitriou, D. "Generalized Multi-Protocol Label Switching (GMPLS) Signaling Extensions for G.709 Optical Transport Networks Control" Network Working Group RFC 4328, The Internet Society, Jan. 2006, pp. 1-23.

* cited by examiner

RECOVERY IN CONNECTION-ORIENTED NETWORK

TECHNICAL FIELD

This invention relates to connection-oriented networks, nodes for such networks, and to recovery of connections in such a network, and to corresponding programs.

BACKGROUND

In a connection-oriented network with a Generalised Multi-Protocol Label Switching (GMPLS) control plane it is possible to establish a connection, called a Label Switched Path (LSP), between network nodes. It is desirable that a network is resilient to the failure of a span (link) between nodes, or to a node. GMPLS includes signalling extensions which support recovery. Recovery provides a way of detecting a failure on a working path, signalling the occurrence of the failure, and then transferring traffic from the working path LSP to a recovery path.

It is possible to recover an end-to-end Label Switched Path (LSP). This is called end-to-end recovery and is defined in IETF document [RFC4872] "RSVP-TE Extensions in Support of End-to-End Generalized Multi-Protocol Label Switching (GMPLS) Recovery". It is also possible to recover a part of an end-to-end LSP. This is called segment recovery and is defined in IETF document [RFC4873] "GMPLS Segment Recovery".

Known recovery methods include using pre-planned (PP) recovery paths, or using pre planned with a back up in case of failure of the pre-planned route. The back up can be a computation on the fly (OTF) of a new recovery path. Alternatively the OTF can be the primary recovery path without any back up PP path.

SUMMARY

A first aspect of the invention provides a method of recovering from failure of a working path for communications traffic in a connection-oriented network, the working path having a preplanned recovery path, involving initiating recovery in response to the failure by requesting computation of a new recovery path for the communications traffic to avoid the failure, and determining if the recovery is not successful within a time limit. If not, then recovery is initiated using the preplanned recovery path. Compared to above mentioned known recovery using PP backed up by OTF, the new ordering can provide more efficient use of the network, as the new recovery path is likely to reuse most of the working path, since it is computed knowing the location of the fault. Thus it can use less network resources than a preplanned recovery path which should minimise reuse so as to cope with a failure anywhere along the working path. The recovery may be slower than the conventional PP, but how much slower can be limited or controlled. Compared to the known OTF schemes, this can help provide greater reliability in case of difficulties in computing the new path or other difficulties. Compared to pure PP recovery, this can provide more efficient use of the network, as the recovery path is likely to be close to the lowest cost working path as the location of the fault is known, and may provide greater reliability. See FIGS. 1-4 for example.

Any additional features can be added or can be disclaimed from the above method, and some such additional features are set out below and are used in dependent claims. One such additional feature is that the determining if the recovery is not successful and initiating the recovery using the preplanned recovery path are carried out by an ingress node of the working path. This can be an efficient location for such functions, to reduce delays in passing information or commands between nodes. See FIGS. 5, 6 and 7 for example.

Another such feature is the step of requesting computation comprising sending a request to a centralised path computation element and the method having the step of carrying out the computation of the new recovery path at the centralised path computation element. This can be an efficient location for such functions, to reduce delays in passing information between nodes, since the path computation needs up to date information about availability of resources at all parts of the network. See FIGS. 5, 6 and 7 for example.

Another such additional feature is the step of adapting the time limit during operation. This can enable the time limit to be optimised to suit different conditions or types of traffic, thus making the network more flexible, or can enable a better trade off between more efficient use of resources or increasing performance. See FIG. 8 for example.

Another such additional feature is adapting the time limit automatically according to a current status of the network. This can enable the recovery performance to be degraded gracefully when the network is particularly busy for example.

Another such additional feature is the preplanned recovery path being arranged to use resources shared with other paths. This can help enable more efficient use of resources. See FIG. 8 for example.

Another such additional feature is checking if the shared resources are still available, and if not, then requesting a new preplanned recovery path. This can help enable a better trade off between efficient sharing of resources and availability of the preplanned recovery path, which affects reliability of the recovery. See FIG. 8 for example.

Another such additional feature is the steps of determining if the recovery is not successful and initiating the recovery using the preplanned recovery path being carried out by a centralised recovery management part. Benefit: such centralised control of recovery can enable use of simpler nodes and easier upgrading and maintenance, though with more delays involved in communications with nodes.

Another such additional feature is sending a request to a local path computation element at an ingress node of the working path and the method having the step of carrying out the computation of the new recovery path at the local path computation element. Benefit: this use of distributed path computation can help enable more scalability of the network, though more communications between nodes may be needed. See FIG. 9 for example Another aspect provides a node for a connection-oriented network, the network being arranged to recover from failure of a working path for communications traffic in the network, the working path having a preplanned recovery path. A recovery control part is provided configured to initiate recovery by requesting computation of a new recovery path for the communications traffic in response to the failure. A timer is provided configured to determine if the recovery is not successful within a time limit, wherein the recovery control part is configured to respond to an output from the timer to initiate recovery using the preplanned recovery path.

Another such additional feature is the node being an ingress node of the working path.

Another such additional feature is the node being configured to request computation by sending a request to a centralised path computation element and configured to receive an indication of the new recovery path from the centralised path computation element.

Another such additional feature is the timer being arranged such that the time limit is adaptable during operation.

Another such additional feature is the preplanned recovery path being arranged to use resources shared with other preplanned recovery paths and the recovery control part being configured to check if the shared resources are still available, and if not, then request a new preplanned recovery path.

Another such additional feature is a local path computation element, and the recovery control part being configured to request computation by sending a request to the local path computation element for computation of the new recovery path.

Another aspect of the invention provides a centralised recovery management part for a connection-oriented network, the network being arranged to recover from failure of a working path for communications traffic in the network, the working path having a preplanned recovery path. The centralised management part has a centralised control part configured to initiate a recovery by carrying out a computation of the new recovery path in response to the failure, and a centralised timer part to determine if the recovery is not successful within a time limit. If not, the centralised control part is configured to respond to an output from the centralised timer to initiate the recovery using the preplanned recovery path.

Another aspect provides a computer program having machine-readable instructions which when executed by a processor cause the processor to perform the method.

Any of the additional features can be combined together and combined with any of the aspects. Other effects and consequences will be apparent to those skilled in the art, especially over compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

Embodiments of the invention will be described, by way of example only, with reference to the accompanying drawings in which.

DETAILED DESCRIPTION

Figure 1:
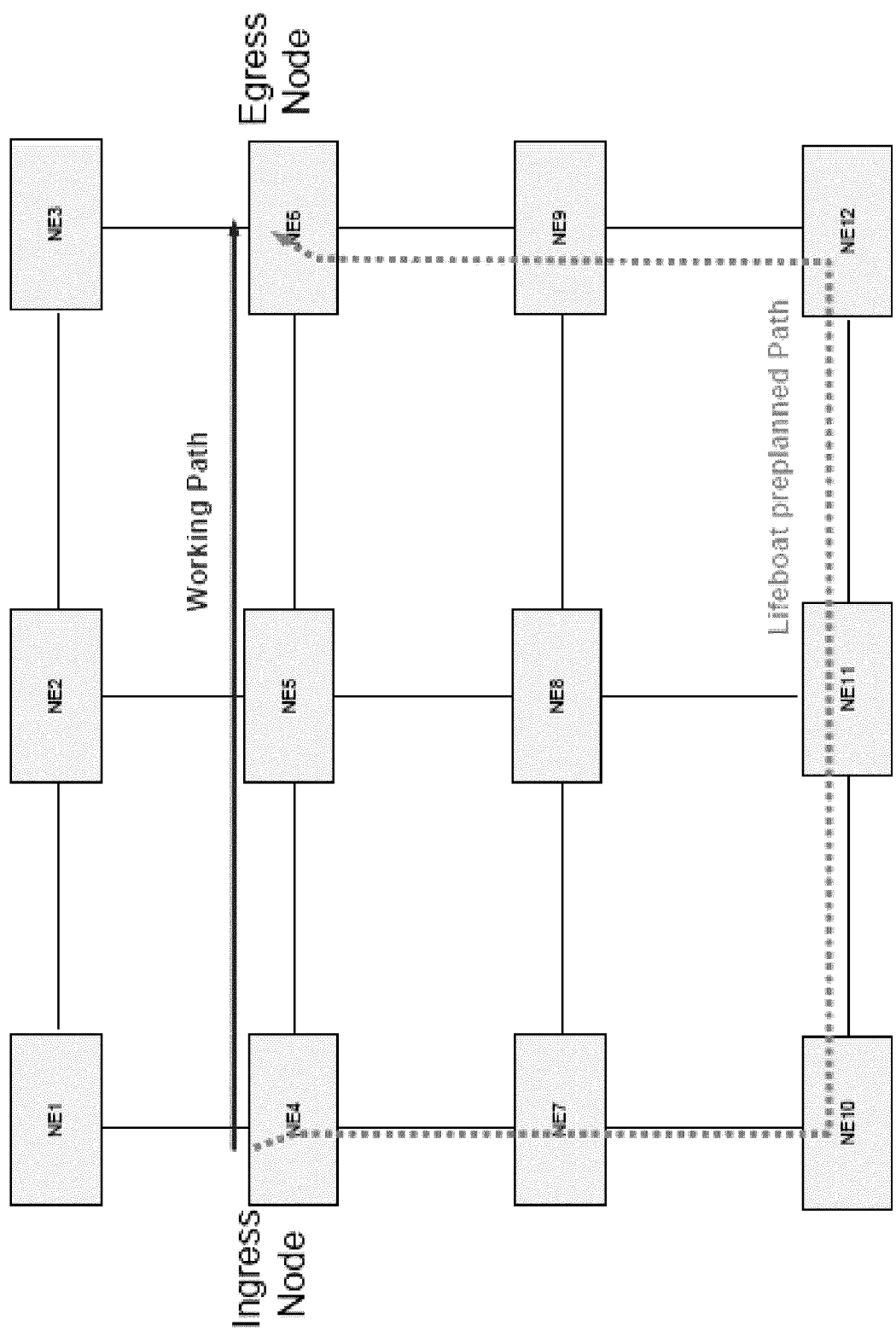
FIG. 1 shows a network with a working path and a Lifeboat pre-planned path provided at planning time.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes.

Abbreviations:
AP Alternative Path
DCN Data Communication Network
GMPLS Generalized MultiProtocol Label Switching
LSP Label Switched Path
LSR Label Switched Routing
NMS Network Management System
OSPF Open Shortest Path First
OSS Operational Support System
OTF On The Fly
OTN Optical Transport Network
PCE Path Computation Element
PP Pre Planned
ROADM Reconfigurable optical add drop multiplexer/demultiplexer
RSVP-TE Resource Reservation Protocol—Traffic Engineering
SDH Synchronous Digital Hierarchy
TDM time-division multiplexed
WDM Wavelength Division Multiplexed
WSON Wavelength Switched Optical Network

DEFINITIONS

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

Elements or parts of the described nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to nodes can encompass any kind of switching node, not limited to the types described, not limited to any level of integration, or size or bandwidth or bit rate and so on.

References to switches can encompass switches or switch matrices or cross connects of any type, whether or not the switch is capable of processing or dividing or combining the data being switched.

References to programs or software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

References to paths can refer to any kind of path between nodes including spatially separate paths or paths multiplexed together with no spatial separation for example, multiplexed by time, or frequency, or wavelength and so on, and carried by any medium, for example metal, optical fiber, wireless transmission and so on.

References to circuits can encompass any kind of circuit, connection or communications service between nodes of the network, and so on, The network can have a Generalised Multi-Protocol Label Switching (GMPLS) or a Multi-Protocol Label Switching (MPLS) control plane. Data plane connections can be packet based (e.g. IP/MPLS or MPLS-TP) or can use any of a range of other data plane technologies such as wavelength division multiplexed traffic (lambda), or time-division multiplexed (TDM) traffic such as Synchronous Digital Hierarchy (SDH). The recovery scheme can also be applied to other connection-oriented technologies such as connection-oriented Ethernet or Provider Backbone Bridging Traffic Engineering (PBB-TE), IEEE 802.1Qay.

The term "failure detection" is intended to include detection of a fault or failure.

The term "recovery" is intended to include "protection", which typically means that a recovery path is preconfigured in advance of detecting any fault or failure, as well as "restoration", which typically means that signalling to configure a recovery path occurs after detection of failure.

For the particular example of LSP networks, rfc 4427 explains these terms as follows:

A. LSP/Span Protection denotes the paradigm whereby one or more dedicated protection LSP(s)/span(s) is/are fully established to protect one or more working LSP(s)/span(s).

For a protection LSP, this implies that route computation took place, that the LSP was fully signaled all the way, and that its resources were fully selected (i.e., allocated) and cross-connected between the ingress and egress nodes. For a protection span, this implies that the span has been selected and reserved for protection.

Indeed, it means that no signaling takes place to establish the protection LSP/span when a failure occurs. However, various other kinds of signaling may take place between the ingress and egress nodes for fault notification, to synchronize their use of the protection LSP/span, for reversion, etc.

B. LSP/Span Restoration denotes the paradigm whereby some restoration resources may be pre-computed, signaled, and selected a priori, but not cross-connected to restore a working LSP/span. The complete establishment of the restoration LSP/span occurs only after a failure of the working LSP/span, and requires some additional signaling.

Both protection and restoration usually use signalling between nodes, for example to establish the recovery resources and signaling associated with the use of the recovery LSP(s)/span(s).

References to OSS are intended to encompass systems to enable telecommunications companies or operators to manage, monitor and control their telecommunications networks. Some or all of functions such as billing, customer care systems, directory services, network element and network management, and service management functions such as handling new customers, service activation with subsequent service assurance can be undertaken by such systems. They can encompass software systems providing an interface that provides operations, administration and maintenance (OAM) capabilities for multiple network elements.

References to a connection-oriented network are intended to encompass any kind of connection oriented network, and combinations of connection oriented and packet based technologies.

The functionality described herein can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Embodiments can be programs in the form of machine-readable instructions (software) which, when executed by a processor, perform any of the described methods. The programs may be stored on an electronic memory device, hard disk, optical disk or other machine-readable storage medium or non-transitory medium. The programs can be downloaded to the storage medium via a network connection.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

By way of introduction to features of embodiments of the invention, some discussion of known features will be presented.

Effects of Different Control Planes

A control plane is one of the main features that network operators are requesting on newly deployed Network Elements spanning every network segment, from access to core, and operating on every combination of transport technologies. Different flavors of control planes exist nowadays, but they can be grouped into three major families: Pre-planned control planes, centralized control planes, and distributed control planes.

Each of them has its own advantages and drawbacks. In particular the preplanned solution allows a strong control of the resources and Traffic Engineering (TE) of the network but it is fully off-line and pre-planned paths, including Alternative Paths (AP) for recovery purposes, must be provided at each ingress node.

The centralized control plane still allows a good control of paths and resources and provides an excellent management of restoration priorities and concurrent path computation. Path computation is done in real time by a central entity. This allows the rerouting of failed LSPs to paths which bypass the failed resources and an efficient reuse of the working LSP resources as much as possible (highly desired). The major drawback of this solution is the communication between the nodes and the centralized entity when failures impact a high number of LSPs. In this scenario the DCN (Data Communication Network), used for signalling or message passing or reporting between nodes or between nodes and management entities, can be overloaded and the request/provision of APs can be rather slow, having non negligible impacts on the restoration time.

A distributed control plane does not have these kinds of problems as each node independently computes its own APs, but different problems are generated by the potential simultaneous attempts of using the same resources and the huge amount of information that, in particular in WDM networks, need to be flooded all over the network.

Comparison of Centralized Dynamic Versus Distributed Control Planes

GMPLS was originally conceived as a fully distributed architecture, according with the common practice of previous mainstream packet switching technologies (e.g., IP, ATM). Nevertheless, the distribution of the path computation function on the network elements is not a theoretical need. The possibility of different architectures has been acknowledged for a few years within IETF itself, CCAMP working group, with the PCE specifications.

By relaxing the constraint of having path computation instances coupled 1-to-1 with all the network elements, other arrangements are possible: in particular, the path computation can be centralized within the NMS, a solution which is well proven by years of transport network practice.

The same functions can be offered in both centralized and distributed path computation implementations, providing some advantages and disadvantages of either solution for specific applications, which can be categorized as follows:
- database completeness
- computational performance
- database coherency
- scalability
- reliability
- upgradeability and maintenance
- troubleshooting Each of these will now be considered to explain some of the considerations affecting restoration.

Database Completeness

In the distributed path computation implementation, the network database is replicated in all the network elements and relies on the routing protocol (OSPF with TE extensions) to be kept up to date. To reduce the embedded database size as well as the traffic load on the communication network, the network database is summarized. This means that not all the available information are distributed e.g. the Link Component inside a Traffic Engineering link are not advertised. Another example, is that each NE can record full routing information only for the paths it originates, and not for all the paths in the network.

Although the technology is constantly increasing computing power of embedded systems and bandwidth of data and control communication networks, keeping the local NE databases within a limited size and reducing the traffic load on the communication network remains a good practice.

A centralized path computation, on the other hand, is implemented in a full fledged computing system, with no database size issue to consider. Moreover, as it is implemented in the same system as the NMS, its updates happen within the same context, relying on either the event reporting process or on locally generated information. Hence there is no issue on the communication network either.

Maintaining detailed network information is especially important in photonics networks, where a correct path computation shall take into account both physical resource features and full wavelength allocation of all the configured lightpaths. This information is not foreseen to be advertised by todays OSPF-TE modification so can be available only in case of centralized implementation.

Computational Performance

While in a distributed control plane the path computation can exploit the parallelism in sharing the computational load among several NEs, in the centralized control plane this is compensated by the superior resources of the NMS computers. It must be also considered that, in any case, the time required by the path computation is negligible with respect to the other phases of the path set-up process (signaling and connection implementation).

Database Coherency

The multiple database instances replicated in the NEs in a distributed control plane must be kept coherent. This is achieved by means of the flooding process in the routing protocol. Unfortunately, the state-of-the-art performances of modern link-state-packet routing protocols (OSPF, ISIS) require on the average tens of seconds to converge. In a centralized control plane, with a single database instance, this problem does not exist.

Scalability

The network size is a typical parameter limiting the scalability of a control plane. The common solution to this problem is achieved by splitting the control into several areas, where each control plane instance has full visibility of the area of its responsibility and a summarized view of the external areas. The distributed control plane offers no mitigation to the scalability issue, as it needs to maintain the entire network database on each NE. On the contrary, the larger computational resources of the NMS and the absence of the aforementioned database coherency problem make the centralized solution less sensitiveness to network size.

Reliability

Even if a properly distributed architecture is inherently fault-tolerant and a centralized one represents a single point of failure, modern servers feature effective and mature technology to implement highly reliable computing systems. These include computer clusters, disk mirroring, storage area networks and geographical dispersion for disaster recovery.

Upgradeability and Maintenance

A centralized implementation, located in normally manned offices, represents a clear advantage over a field distributed arrangement from a maintenance perspective. Especially for system upgrades, the centralized approach is definitely less risk-prone, allowing path computation upgrades without requiring release changes on dozens of NEs in the network.

Troubleshooting

A centralized implementation assures a better troubleshooting with respect to a full distributed implementation, this is because all the log files are stored on NMS and can be accessed at any time.

Issues with Centralized Control Planes

Two main issues exist with the centralized solution during the restoration phase, these issues being restoration time, and restoration reliability. Restoration time is concerned with the fact that, as soon as an ingress node detects a failure, it sends a request for a new path to the centralized PCE. The request is processed on a priority basis (lower priority means longer time) and the computed path is sent back to the ingress node. The time needed for this procedure is highly unpredictable as it depends on the number of concurrent path computation requests, DCN load etc.

The reliability issue depends on the reliability of the centralized PCE. Most implementations foresee the utilization of a redundant PCE that becomes active as soon as the working one fails or becomes somehow unreachable. The usage of redundant PCEs allows significant reduction of outage time but some periods in which restoration is not possible due to PCE unreachability are still there.

A common way to mitigate pros and cons of the different approaches is the so called "Protection+Restoration". This procedure consists on reacting to the first failure, affecting the working path, with a Protection switch (i.e. a pre-planned path, already available on ingress node and fully disjointed from the working one is used as soon as the failure is detected). A second failure is then managed by a Restoration process (i.e. with pure OTF restoration, where the ingress node asks the PCE for a restoration path). This method enables a saving in hardware resources, for a given resiliency level (e.g. full defence from double failures), compared with an "all Protection" recovery approach.

Introduction to Features of Embodiments

The proposed restoration method can be seen as introducing a safeguard clause into the conventional "on the fly" recovery scheme. If an alternative path is not found within a predefined time limit, a preplanned, shared, alternative path is ready to operate and save the traffic. The method is suitable for centralized control plane architectures, or other architectures and can combine some of the advantages of the on the fly and the preplanned schemes, reducing the drawbacks of their operation when carried out individually without combination.

It is desirable that pre-planned recovery paths be fully disjoint from the working path, because they must be able to protect it from a failure occurring on any of its nodes or link, as it is not possible to know at planning time where the fault will occur. Also, many customers require that the restoration path reuses as many resources of the working path as possible, but this is only possible with an OTF restoration, where the path computation is performed after the failure occurred and hence aware of what resource does it impact. At the same time there is the requirement that the restoration at the first failure must be always provided and within a given time.

All of these requirements cannot be met by the pre-planned approach or the dynamic centralized one individually, but a combination of on the fly restoration followed by pre-planned protection as a back up, can do so. This procedure can be called "Lifeboat Restoration", and examples will be described in more detail.

Figure 2:
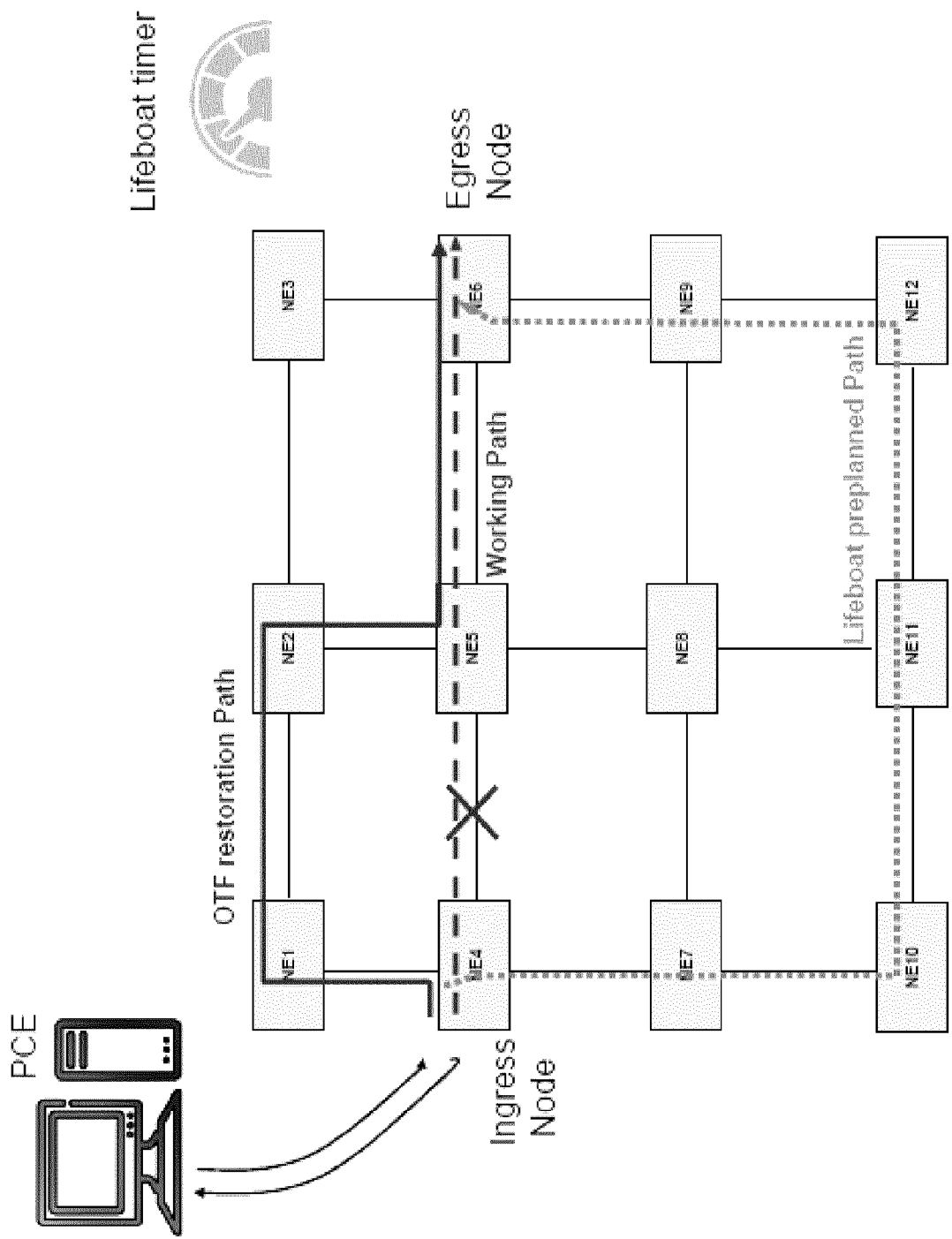
FIG. 2 shows the same network after successful OTF recovery before timer expiration.
Figure 3:
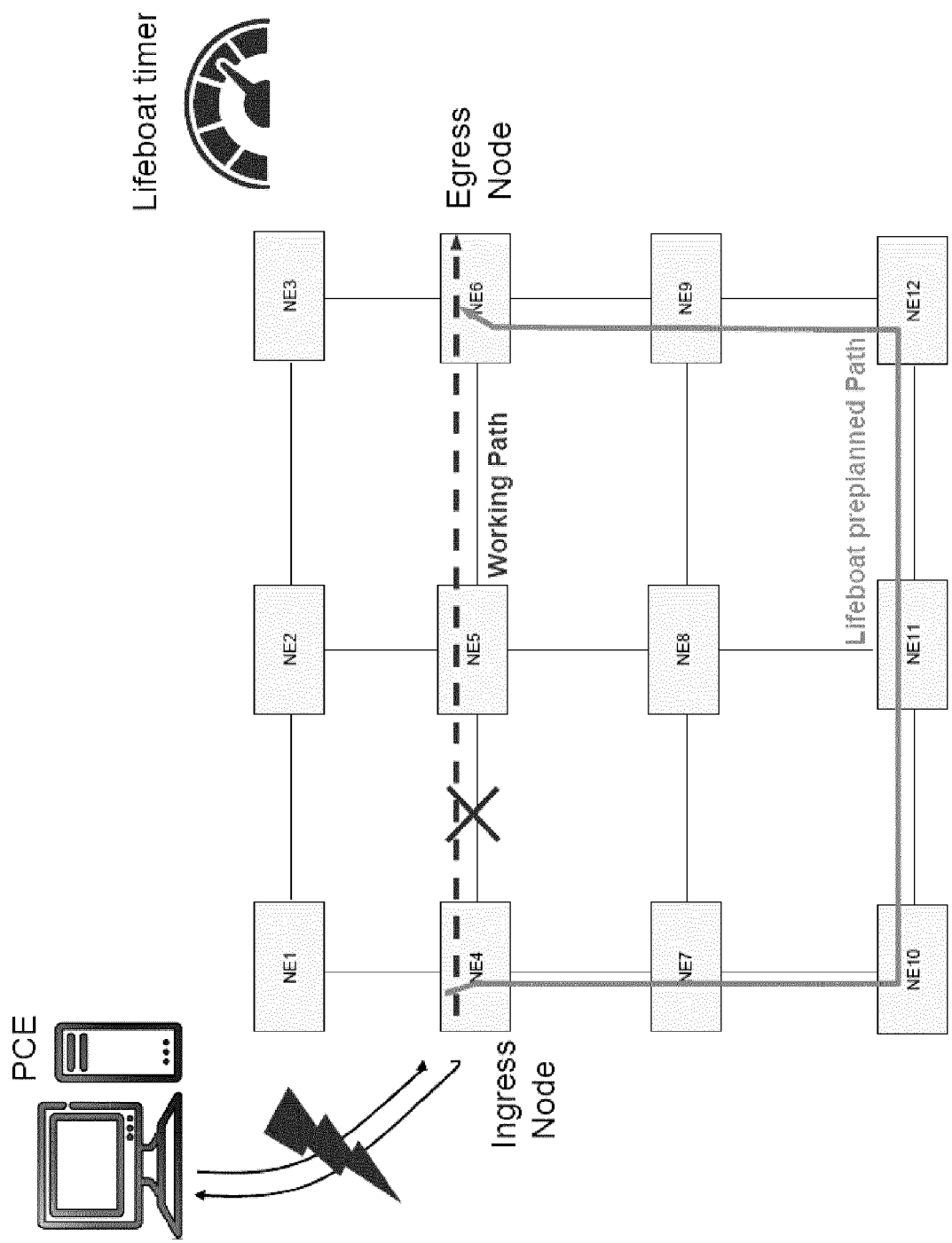
FIG. 3 shows the same network after OTF was unsuccessful and the preplanned path was used.

FIGS. 1-3 Network Views of an Embodiment

FIGS. 1 to 3 show three views of the same network at different times during a failure and restoration. 12 nodes of the network are shown, labelled as network elements NE1 to NE 12. NE4 is an ingress node for a working path of one traffic request. There may be hundreds or thousands of such requests and paths. NE6 is the egress path for this particular working path, and it is routed via NE5, as shown in FIG. 1, before any failure. Also shown in FIG. 1 is a preplanned alternative route, or lifeboat path, via NE7, NE10, NE11, NE12, NE 9 to reach the egress node.

FIG. 2 shows the same view after a failure indicated by an "X", between nodes NE4 and NE5. A restoration controller shown next to the PCE has asked the PCE to find a restoration path on the fly (labelled as OTF restoration path). This is shown passing via NE1 and NE2 to NE5, and needs to be found within a designated time limit indicated by the lifeboat timer. Provided this is found and set up successfully in time, the lifeboat preplanned alternative path does not need to be used, and remains available. Notably the OTF restoration path uses fewer nodes and so is more efficient anyway. The OTF restoration path is likely to reuse most of the working path, if the PCE determines or is informed of the location of the failure. This can be indicated in a request from the restoration controller to the PCE, or in any other way.

FIG. 3 shows the same view after a failure indicated by an "X", between nodes NE4 and NE5 and where the restoration controller and PCE have not found a restoration path on the fly within the designated time limit indicated by the lifeboat timer. Instead the restoration controller has used the lifeboat preplanned path to restore this traffic affected by the fault. Note that there are various reasons for no OTF path being used. For example the PCE could take too long if it is overloaded, or there might be no other route available at the time, or the communications to the restoration controller or the PCE might be down. The use of the lifeboat preplanned path could be initiated by the restoration controller or by the ingress node. Clearly if the restoration controller is used, then the method is vulnerable to a break in communications with the ingress node. Nevertheless there may be some cases where this is justifiable, and the other advantages still hold.

The lifeboat method can be summarised in the following steps:

1. Each ingress node is provided at planning time with a pre-planned path for each circuit, fully disjoint from the working one. Such path is not used (FIG. 1).

2. When a failure occurs, the ingress node tries a pure OTF restoration procedure informing the PCE about the failure location and asking for a restoration path.

3. A "Lifeboat timer" is set as soon as the ingress node send the request to the PCE:
   a. If the ingress node receives a path from the PCE before the timer expires, the new path is signalled and cross-connected and the requirements of maximum working resources usage and restoration time have been satisfied (FIG. 2)
   b. If the ingress node does not receive a new path before the expiration of the timer, the pre-planned path is used (FIG. 3)

Figure 4:
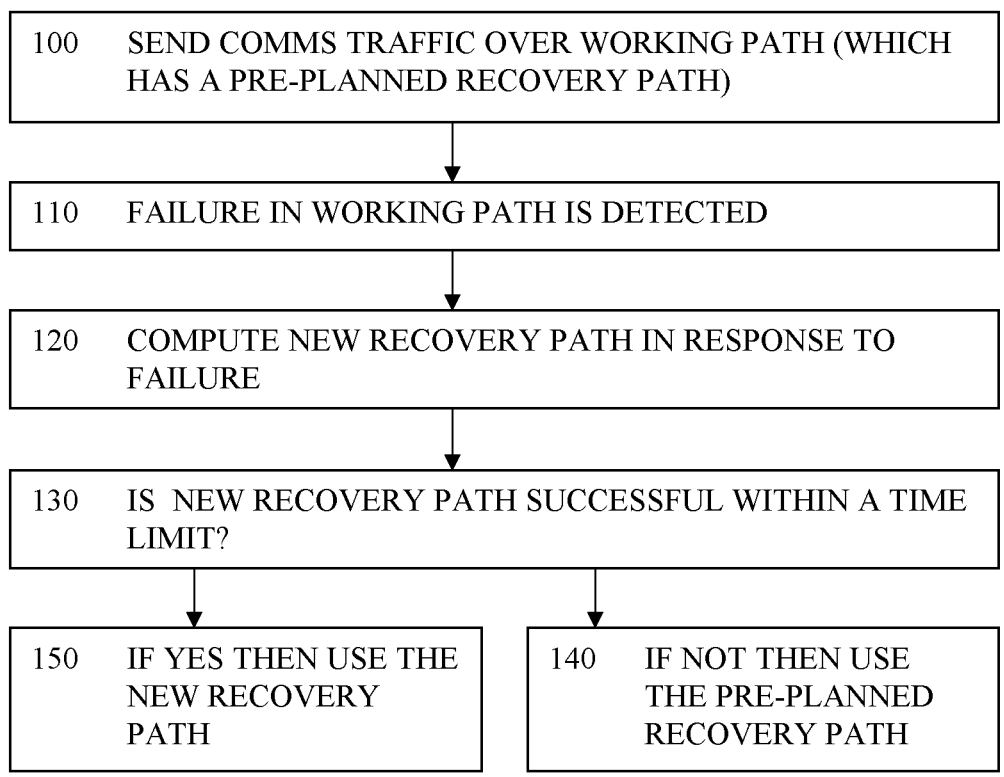
FIG. 4 shows method steps according to an embodiment.

FIG. 4, Method Steps According to an Embodiment

FIG. 4 shows steps according to an embodiment for recovering from failure of a working path for communications traffic in a connection-oriented network. At step 100 communications traffic is sent over a working path which has been set up between nodes of the network. A pre-planned recovery path is reserved but not used. At step 110 a failure in this working path is detected. Recovery is initiated by requesting computation of a new recovery path at step 120 for the communications traffic in response to the failure. This control step can be carried out anywhere in principle, for example locally at an ingress or egress node, or remotely at a central location. At step 130 a determination is made as to whether the requested new recovery path is not successful within a time limit. If not, then at step 140, recovery is initiated using the preplanned recovery path. Compared to the known techniques such as using a preplanned recovery path backed up by using an OTF recovery path if necessary, the new technique involves reversing the usual order of usage of the different types of recovery path. It turns out that this can provide more efficient use of the network, as the new recovery path is likely to reuse most of the working path, since it is computed knowing the location of the fault. Thus it tends to use less network resources than a preplanned recovery path which should minimise reuse so as to cope with a failure anywhere along the working path.

Figure 5:
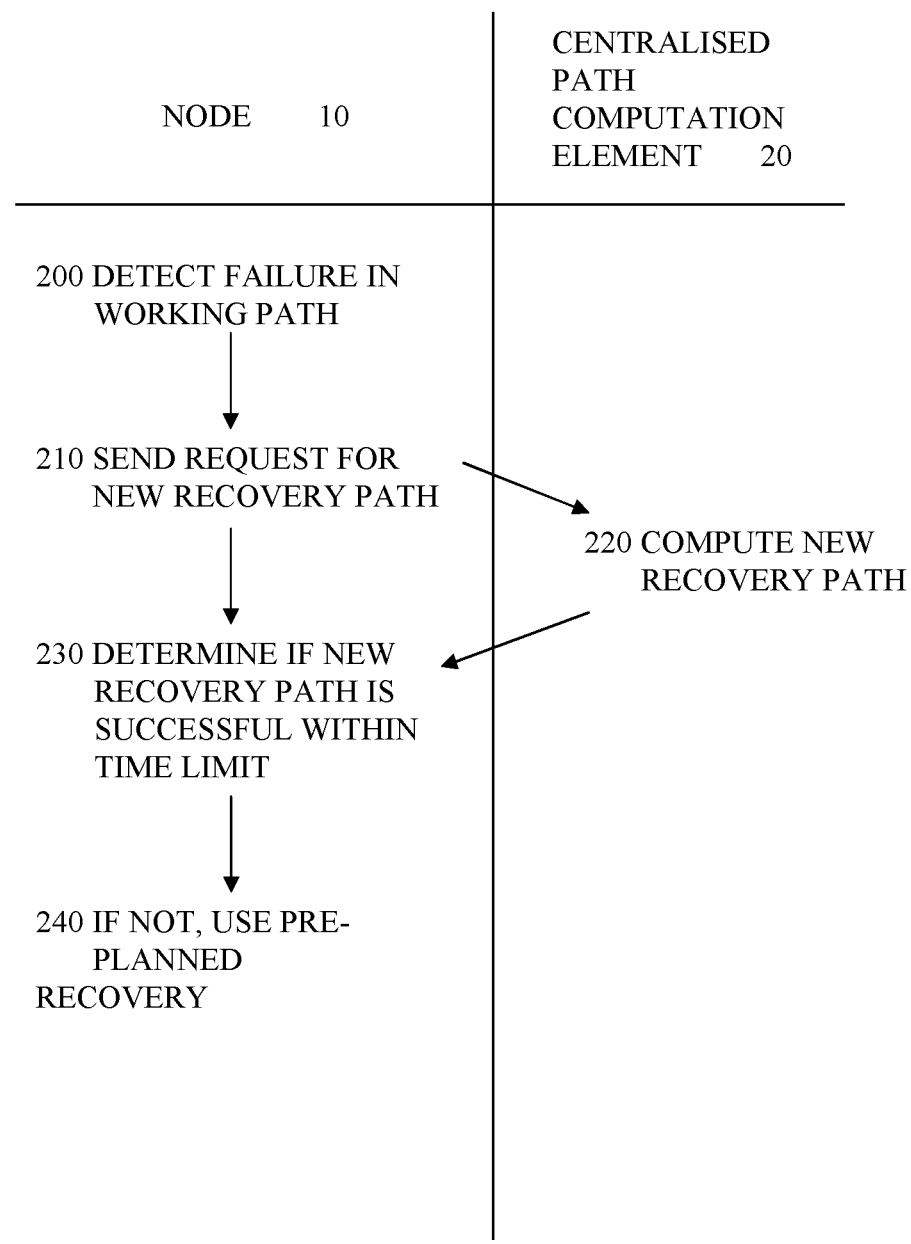
FIG. 5 shows a sequence chart for an embodiment using a centralised PCE.

FIG. 5, Sequence Chart for Embodiment Using Centralised PCE

FIG. 5 shows a sequence chart for an embodiment. Time flows down the chart. A left column shows actions at a node 10 on the working path, and a right column shows actions at a centralised PCE 20. At step 200 the node detects a failure in the working path. At step 210 it sends a request immediately to the centralised PCE. The PCE computes a new recovery path at step 220 and sends this to the node. The node tries to set up the new recovery path and determines if the new recovery path is successful within a given time limit at step 230. This time limit may be set depending on the type of traffic, the service level agreed beforehand, a congestion level of the network, and so on. The new recovery path may fail for any reason, including for example failure to contact the PCE, or to receive response from the PCE, or the PCE being too slow, or being unable to find a path, or the node being unable to set up the computed path. At step 240, if the new recovery path is not successful within the time limit, then the node initiates recovery using the pre-planned recovery path. There are many ways the node could set up the new or the pre-planned recovery paths, by controlling switches or sending messages to other nodes and so on. One example is described in more detail below with reference to FIGS. 12 and 13. The node need not be the ingress node, it is notable here for being the node which controls the recovery method. If it is not the ingress node then it can communicate with the ingress node and other nodes along the path to try to set up the new recovery path.

Figure 6:
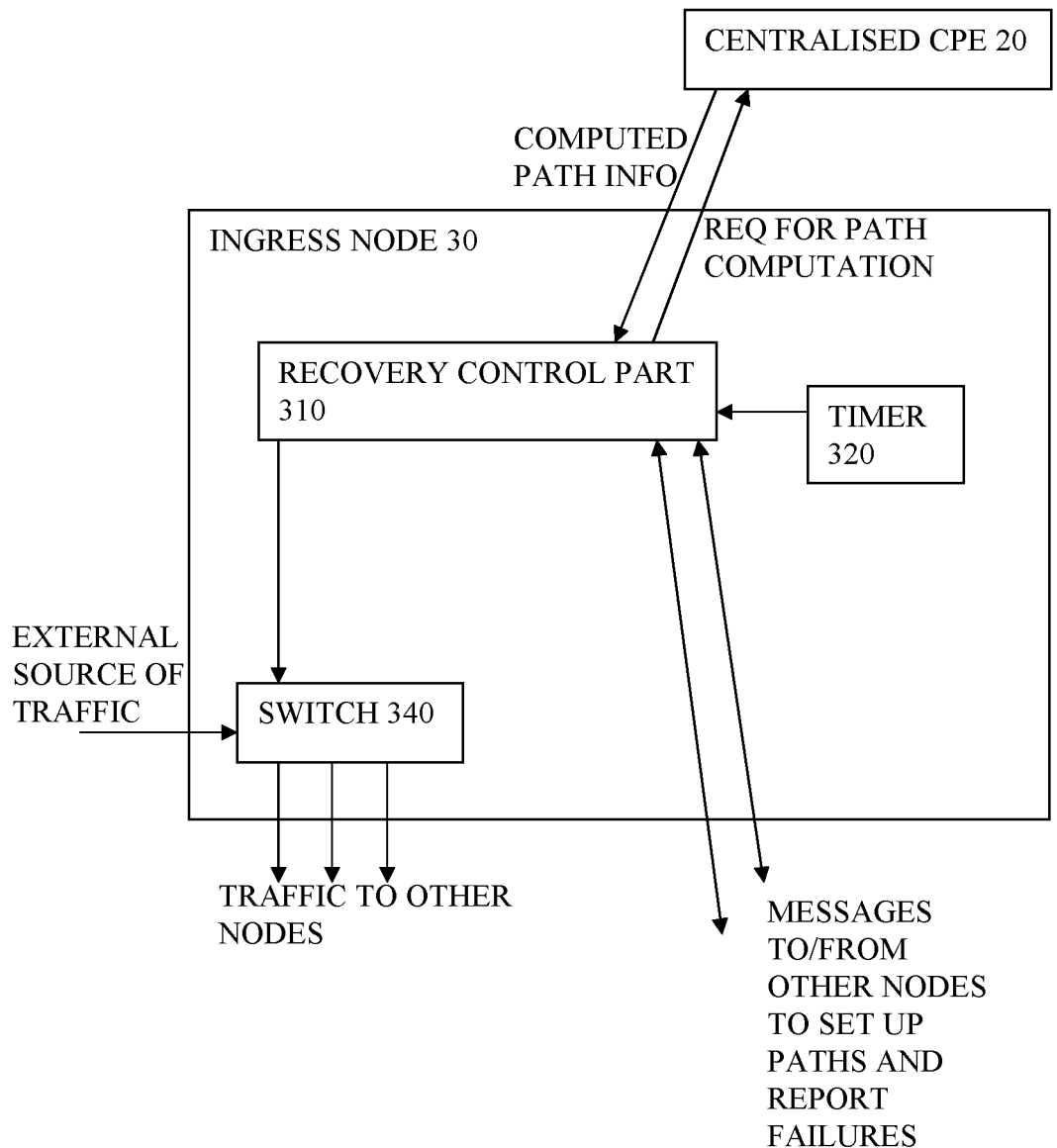
FIG. 6 shows an example of an ingress node according to an embodiment.

FIG. 6, Example of an Ingress Node According to an Embodiment

FIG. 6 shows a schematic view of an ingress node according to embodiment. The ingress node has a recovery control part 310 coupled to a timer 320 and coupled to a switch 340. The switch is for switching the traffic from an external source, onwards to other nodes, and, if the traffic is bidirectional, then switching it in the other direction also. The recovery control part also has interface to send or receive messages to or from other nodes to set up paths and to report failures and status for example. The timer is arranged to indicate the time allowed for the new recovery path to be calculated and set up, before the recovery control part decides to use the preplanned recovery path. The recovery control part also has interfaces to an external CPE, which may be a centralised part 20, or conceivably could be a local part.

Figure 7:
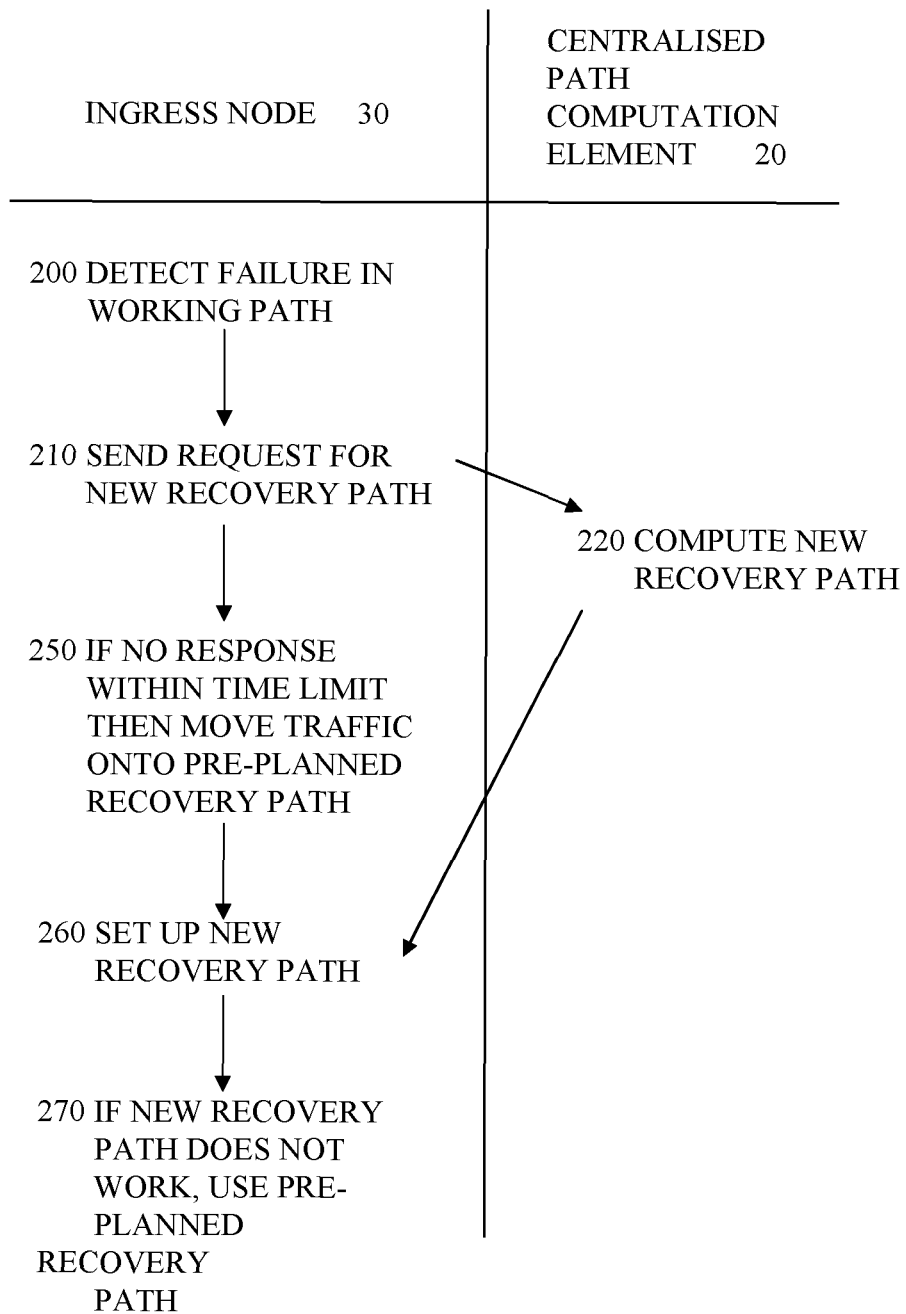
FIG. 7 shows a sequence chart for an embodiment using an ingress node and a centralised PCE.

FIG. 7, Sequence Chart for Embodiment Using Ingress Node and Centralised PCE

FIG. 7 shows a sequence chart for an embodiment using an ingress node to control the recovery. Time flows down the chart. A left column shows actions at the ingress node 30 on the working path, and a right column shows actions at a centralised PCE 20. At step 200 the node detects a failure in the working path. This may be detected first at another node and the failure indication be sent to and detected at the ingress node. At step 210 it sends a request immediately to the centralised PCE. The PCE computes a new recovery path at step 220 and sends this to the ingress node. The ingress node determines at step 250 if no response is received from the PCE within the time limit. Then the ingress node acts to move traffic onto the preplanned recovery path. At step 260 if the ingress node does receive the new recovery path from the PCE in time, then the ingress node sets up the new recovery path and determines if the new recovery path is successful within the given time limit. This time limit may be set depending on the type of traffic, the service level agreed beforehand, a congestion level of the network, and so on. The time limit may include separate time limits for receiving the new path from the PCE, and setting it up successfully in the network. At step 270, if the new recovery path does not work successfully within the time limit, then the node initiates recovery using the pre-planned recovery path.

Figure 8:
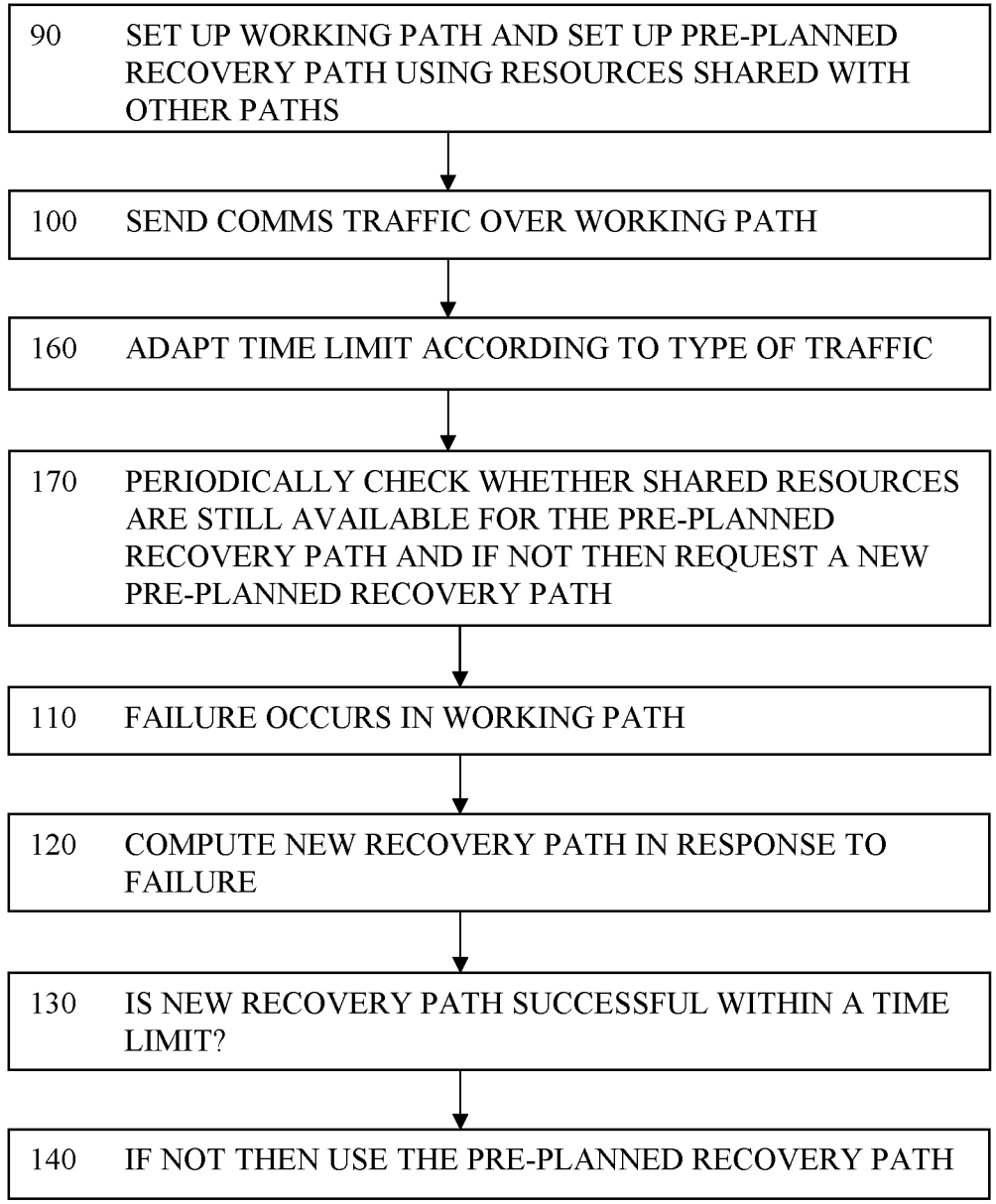
FIG. 8 shows an embodiment with an adaptable time limit, and shared preplanned paths.

FIG. 8, Embodiment with Adaptable Time Limit, and Shared Preplanned Paths

FIG. 8 shows steps of an embodiment similar to that of FIG. 4 but with adaptable time limit, and shared preplanned paths. At step 90, the working path is set up and a corresponding preplanned recovery path is set up, in this case using resources shared with other recovery paths. At step 100 communications traffic is sent over a working path which has been set up between nodes of the network. At step 160, the time limit is adapted for example according to the type of the traffic or according to a service level agreement. At step 170 there is a periodic check as to whether the shared resources are still available for the preplanned recovery path. If not, then a new preplanned recovery path is requested and set up.

At step 110 a failure in this working path is detected. Recovery is initiated by requesting computation of a new recovery path at step 120 for the communications traffic in response to the failure. This control step can be carried out anywhere in principle, for example locally at an ingress or egress node, or remotely at a central location. At step 130 a determination is made as to whether the requested new recovery path is not successful within the adapted time limit. If not, then at step 140, recovery is initiated using the preplanned recovery path. Other embodiments can be envisaged in which the time limit is adaptable without the preplanned recovery path using shared resources. Other embodiments can be envisaged in which the preplanned recovery path uses shared resources without the time limit being adaptable.

Figure 9:
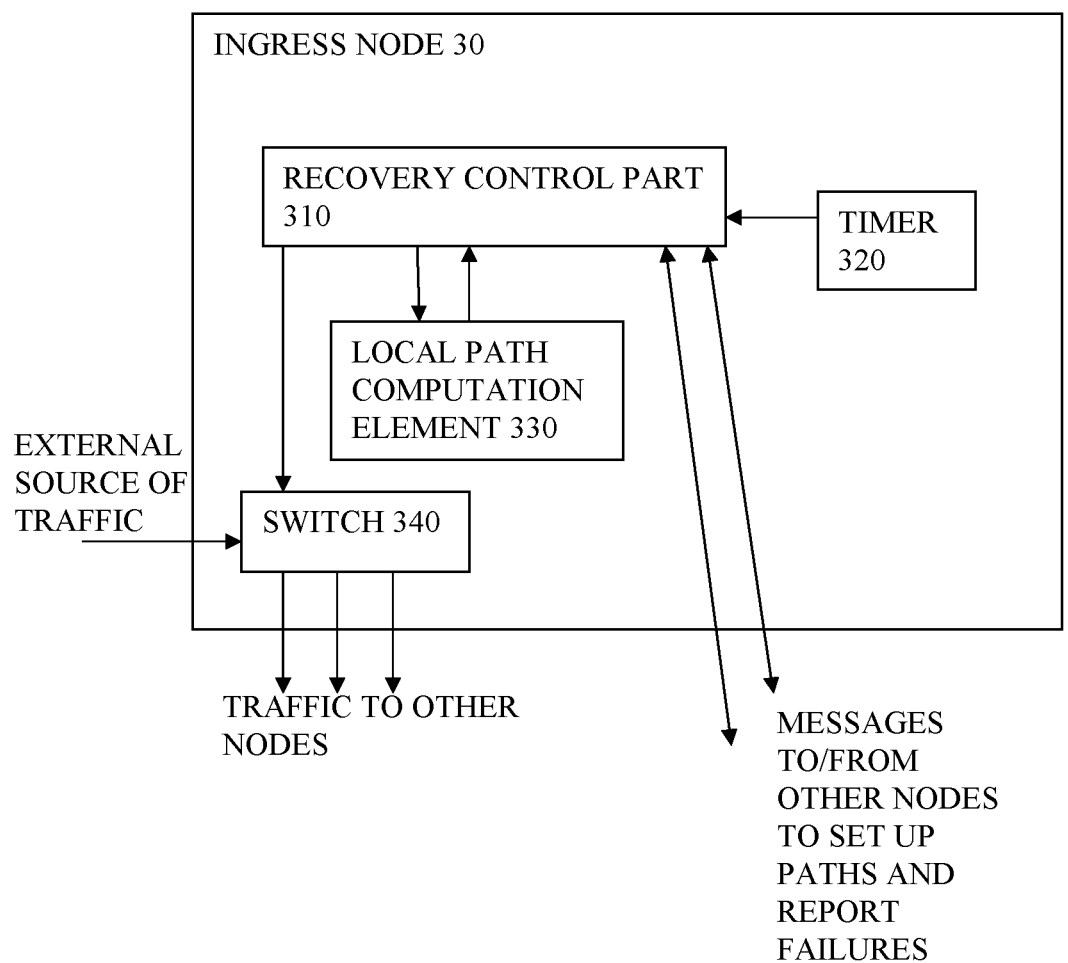
FIG. 9 shows an embodiment of an ingress node with a local PCE.

FIG. 9, Embodiment of Ingress Node with Local PCE.

FIG. 9 shows a schematic view of embodiment of an ingress node 30 similar to that of FIG. 6, but with a local PCE 330. This can be instead of the centralised PCE, or aswell as the centralised PCE. As in FIG. 6, the ingress node has a recovery control part 310 coupled to a timer 320 and coupled to a switch 340. The switch is for switching the traffic from an external source, onwards to other nodes, and, if the traffic is bidirectional, then switching it in the other direction also. The recovery control part also has interfaces to send or receive messages to or from other nodes to set up paths and to report failures and status for example. The timer is arranged to indicate the time allowed for the new recovery path to be calculated and set up, before the recovery control part decides to use the preplanned recovery path. The recovery control part is coupled to the local PCE so that path computation requests can be handled more quickly if needed, by avoiding the delays in sending to a centralised PCE, and the lower reliability caused by the risk of loss of communications. If both local and centralised PCE are provided then requests can be sent to both, and the advantages of both can be combined. The if two different paths are selected in time, the recovery control part can select which to use or can assume that the centrally calculated path will be more likely to be more efficient as being based on a more accurate view of the state of the network, and having more processing power available.

Figure 10:
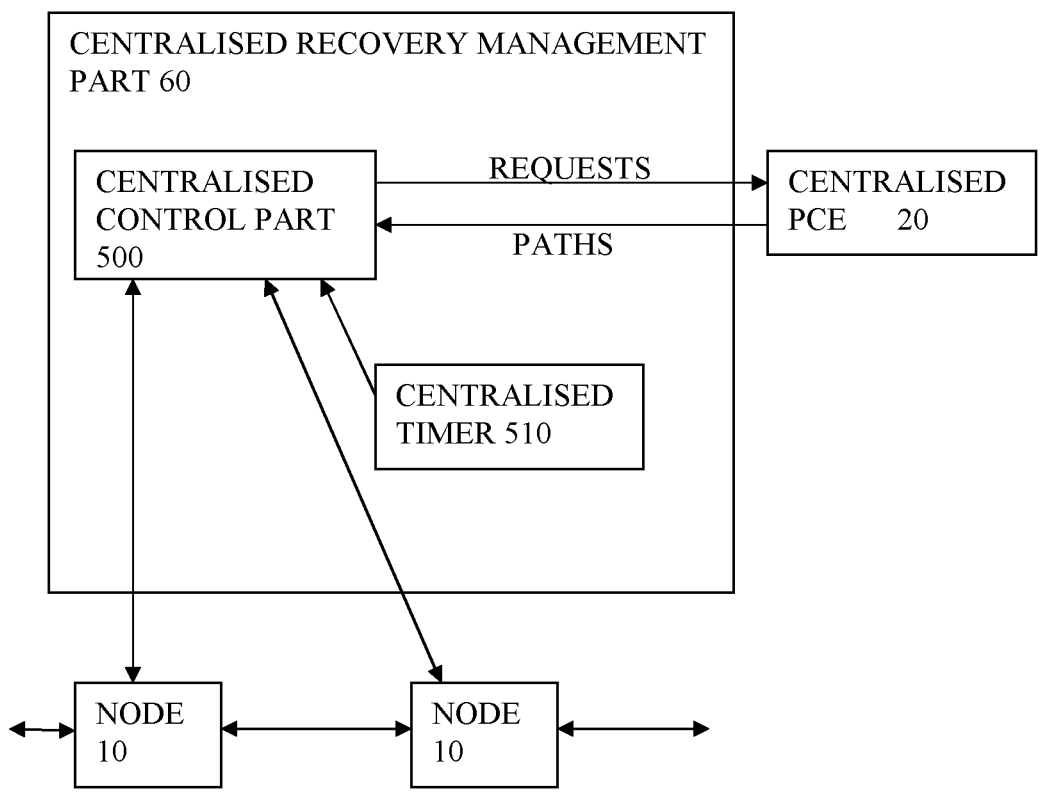
FIGS. 10 and 11 show embodiments using centralised control of recovery.
Figure 11:
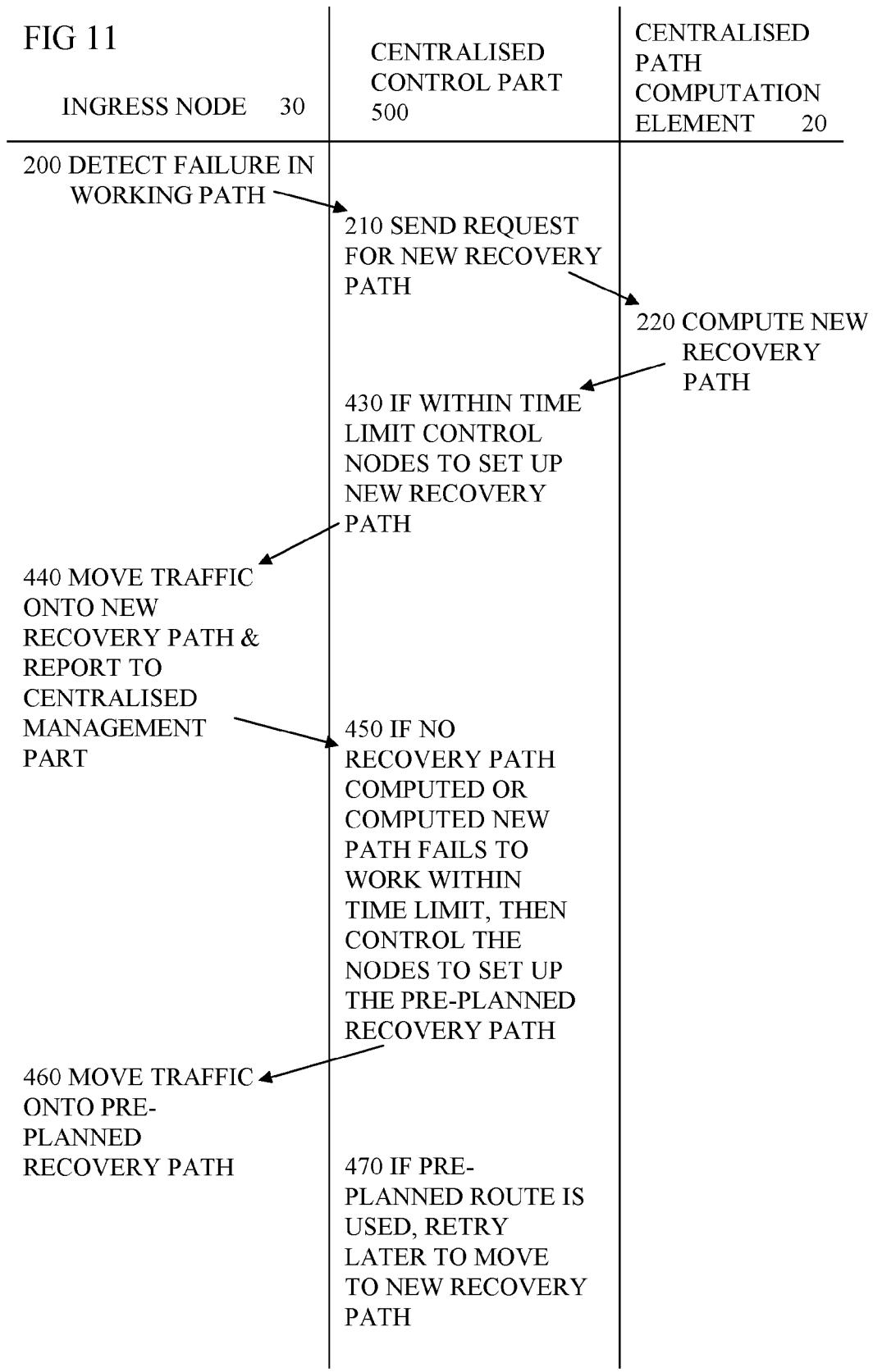

FIGS. 10, 11, Embodiments Using Centralised Control of Recovery

FIG. 10 shows a network view of an embodiment having a centralised recovery management part 60. This has a centralised control part 500 coupled to a centralised timer part 510, and having interfaces to nodes 10, and to a centralised PCE 20. The operation is similar to that described above for localised control at a node. The centralised timer is used to indicate the time allowed for the new recovery path to be calculated and set up, before the centralised control part decides to use the preplanned recovery path. The recovery control part is coupled to send path computation requests to the centralised PCE and receive computed paths.

FIG. 11 shows a sequence chart for operation of the embodiment of FIG. 10 or of similar embodiments. In this case there is a centralised control part to control the recovery. Time flows down the chart. A left column shows actions at the ingress node 30 on the working path, a central column shows actions of the centralised control part 500, and a right column shows actions at a centralised PCE 20. At step 200 the ingress node detects a failure in the working path. This may be detected first at another node and the failure indication can be sent to, and detected at, the ingress node. This is reported to the centralised control part and at step 210 it sends a request immediately to the centralised PCE. The PCE computes a new recovery path at step 220 and sends this to the centralised control part. This part determines at step 430 if a response is received from the PCE within the time limit. If so it sets up the newly computed recovery path, which may involve instructing nodes directly or requesting that the ingress node does so. Once set up, then the ingress node acts to move traffic onto the preplanned recovery path at step 440, and reports to the centralised control part. At step 450 if no recovery path has been computed or if the new path fails to work within the time limit, then the centralised control part acts to set up the preplanned recovery path, either by instructing nodes directly or requesting that the ingress node does so for example. Once the set up, then the ingress node acts to move traffic onto the preplanned recovery path at step 460. At step 470, if the preplanned recovery path is being used then the control part can retry to find a new recovery path later since such paths are likely to reuse most of the working path and therefore be more efficient.

Figure 12:
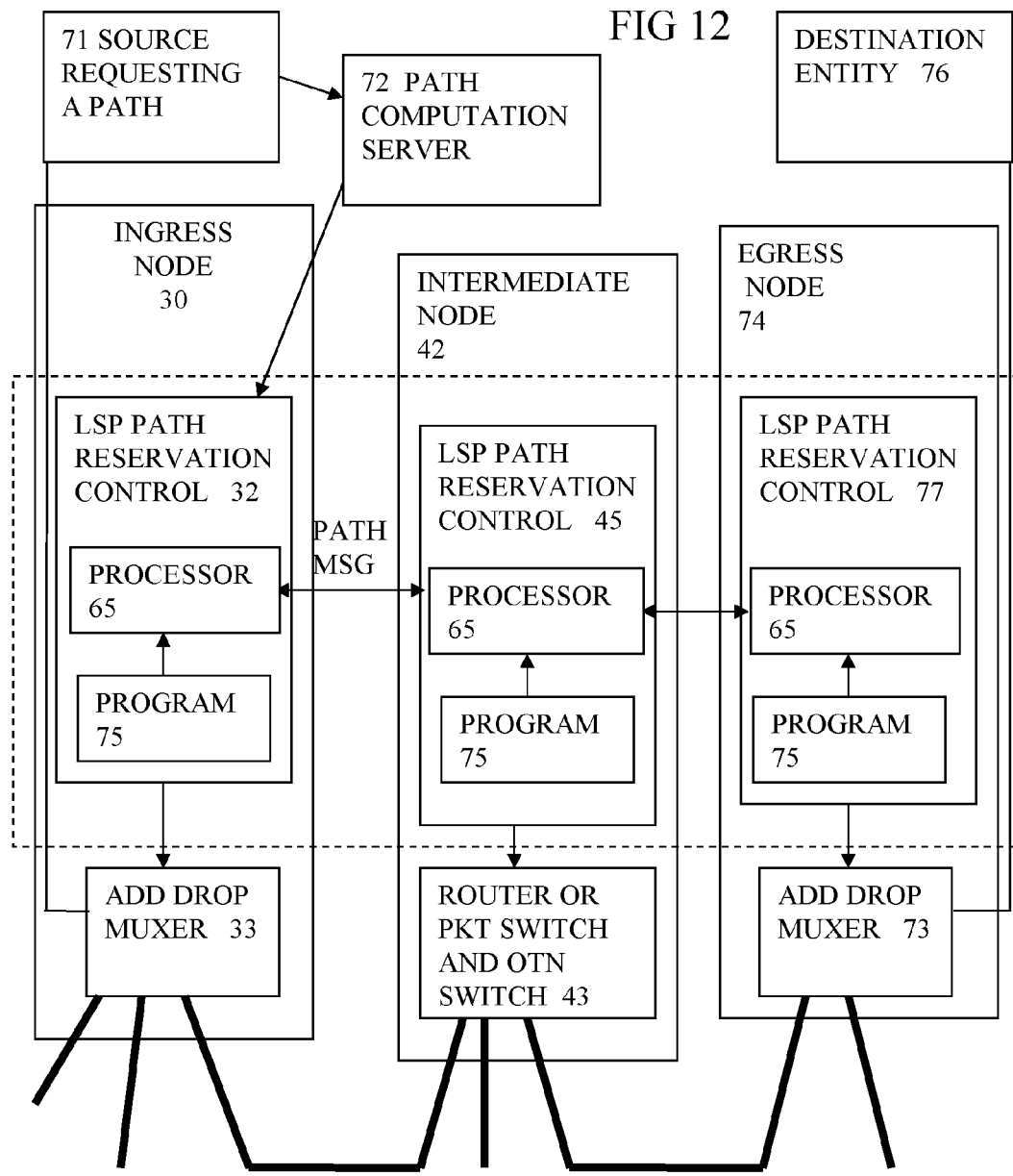
FIG. 12 shows an LSP network embodiment.

FIG. 12, LSP Network Embodiment

FIG. 12 shows a schematic view of nodes in an optical network showing parts used to exchange messages to advertise information or set up paths. Three nodes are shown, there can be many more. An ingress node 30 has an LSR path reservation control part 32, which controls an add drop multiplexer part 33. The reservation control part can have a processor 65 and a store having a program 75 for execution by the processor 65. The program can enable the node to act as an ingress node, or in some cases, to act as an intermediate node for other paths started elsewhere. An intermediate node 42 has its own LSR path reservation control part 45, which controls a part 43 which can be a router or a packet switch and OTN switch for example. Again, the reservation control part can have a processor 65 and a store having a program 75 for execution by the processor 65. The program can enable the node to act as an intermediate node. If the intermediate node had add drop capabilities, then the program could be chosen to make the node act as an ingress or egress node for other paths. An egress node 74 has its own LSP path reservation control part 77, which controls its add/drop multiplexer 73. Again, the reservation control part can have a processor 65 and a store having a program 75 for execution by the processor 65. The program can enable the node to act as an egress node for the path shown, to pass the traffic out of the network to a destination entity 76. The program typically also enables the node to act as an ingress or intermediate node for other paths. A source entity 71 requesting a path is shown, as a source of the traffic for which the new path is needed, through the network to a destination entity 73. A path computation part in the form of a server 72 is shown, coupled to receive a traffic request from source part 71. The path computation part then feeds the selected path to the ingress node 10 for setting up the path as described earlier.

If the path computation part is not in the ingress node, but is a remotely located part, optionally centralized to be used by many different nodes, then a communications protocol between the source of the traffic request and the path computation part is needed. This protocol can indicate what information in what format is needed by the path computation part, and what information and what format is to be used for the output of the path list to the ingress node. RFC 4657 is a known example of such a protocol, for use with path computation parts corresponding to the known standard RFC 4655.

The processors of each node can pass messages to each other to advertise information to be used by the path computation server, as described below with reference to FIG. 13.

Optical links are shown for carrying the traffic between the nodes, and a connection is shown between the control parts of the nodes for passing messages to reserve the path. This connection can in principle use either the same or different physical links to those used by the traffic between nodes. The optical links for the traffic can have a multiplex structure of trib slots. A path can use one or more of these trib slots, and a reservation procedure needs to indicate which of these trib slots is reserved.

Figure 13:
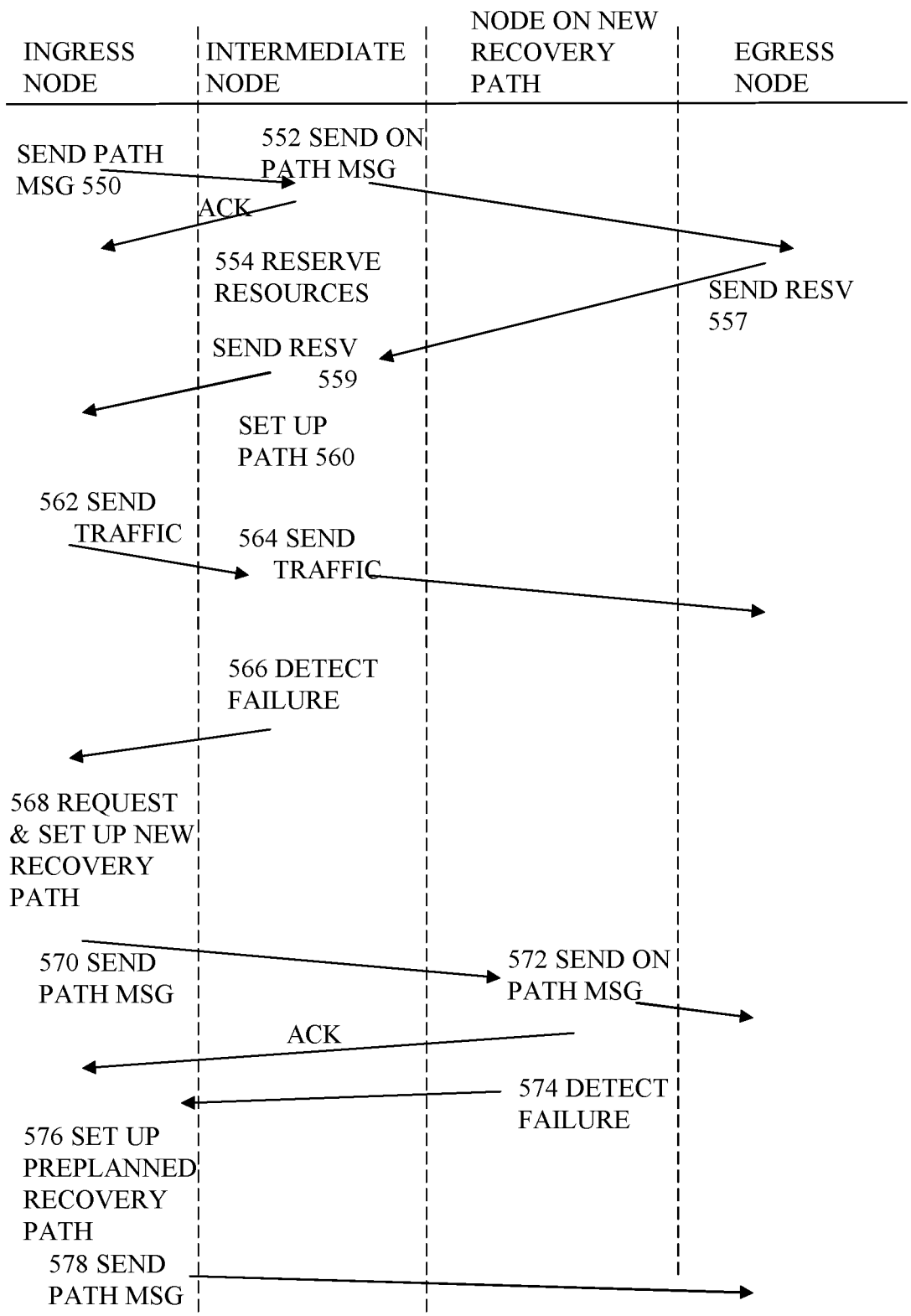
FIG. 13 shows a sequence chart of LSP path set up, failure and lifeboat restoration.

FIG. 13, Sequence Chart of LSP Path Set Up, Failure and Lifeboat Restoration.

FIG. 13 shows a sequence chart showing operations of a network such as that of FIG. 12, using a message based operation to set up a new path, and to restore it after failure.

Time flows downwards. A left hand column shows actions of the ingress node. A next column shows actions of an intermediate node on a working path. A next column shows actions of a node on a new recovery path, and a right hand column shows actions of an egress node.

One example of a message based operating method involves using RSVP. A first step is the source entity requesting a new label switched path (LSP) from a first node to another node. This first node can be any node which has add or transmit capability, and this now becomes referred to the ingress node for this path. The second node can be any node which has a drop or receive capability, and this now becomes referred to as the egress node for this path. The request can be authorized by a network management system, or by a human operator for example, and a path computation part can determine a route to the destination or egress node from the ingress node. Then a command goes to the ingress node to reserve the path.

The ingress node receives the new path from a path computation processor, and follows the conventional path set up sequence which involves sending a message (such as an RSVP "PATH" message) along the path to reserve resources. The PATH message, in the form of a Generalized Label Request, is sent out 550 from the first node (which acts as an ingress node) and sent on 552 via intermediate nodes along the proposed path, to the last node (acting as an egress node). The intermediate nodes reserve resources 554 for the path. When the PATH message reaches the egress node, if no nodes rejected the path, then a return message is sent 557, (such as an RSVP "RESV" message). The intermediate node passes on 559 this message and sets up the path 560 using the reserved resources such as bandwidth on switch paths and ports, for the requested path, for traffic of a signal type specified in the message. If this return message is received at the ingress node, then the ingress node can assume the path is ready and can start sending traffic 562 over the path. The intermediate nodes send on the traffic 564 to the egress node.

A failure is detected 566 by the intermediate node and reported to the ingress node. The ingress node requests a new recovery path from a PCE and sets it up 568. This involves sending a PATH message 570 which is acknowledged and sent on 572 by nodes along the new recovery path, to the egress node. If such a node detects a failure 574, or cannot set up the new recovery path, this is reported to the ingress node which sets up the preplanned recovery path 576. This again can involve sending a PATH message 578 and so on, or can be switched in by the egress node in some cases without further message passing, if the egress node detects the loss of traffic for a given time. Other implementations of setting up paths, using other protocols can be envisaged.

The Generalized Label Request is a message used by RSVP-TE for the signaling of a Label Switched Path (LSPs) on any kind of network technology. It is defined in RFC3471 and extended in RFC 4328 in order to support G.709 OTN architecture. It includes a common part (i.e., used for any switching technology) and a technology dependent part (i.e., the traffic parameters).

Traffic Engineering (TE) is the process where data is routed through the network according to the availability of resources and the current and expected traffic. The required quality of service (QoS) can also be factored into this process. Traffic Engineering may be under the control of operators whereby they monitor the state of the network and route the traffic, or provision additional resources, to compensate for problems as they arise. Alternatively, Traffic Engineering may be automated. Traffic Engineering helps the network provider make the best use of available resources, spreading the load over the layer 2 links, and allowing some links to be reserved for certain classes of traffic or for particular customers. Technologies such as Multi-Protocol Label Switching (MPLS) and its extensions (i.e. GMPLS, T-MPLS), provide efficient TE solutions within a single domain thanks to their connection oriented nature, to minimize costs.

Path Computation

Typically, computing of paths is carried out using a computer model of the network. This is one way to implement path computation, others can be envisaged. The model of the network is provided or built up, having a separate virtual link for each choice of traffic aggregation, each port or sub-port and so on. Current information on available capacity and costs are assigned to each link. This can involve finding information from the nodes, or predetermined or predicted information can be assigned. There can be weighting of links according to congestion level and other criteria.

The nodes may periodically send an advert to other nodes and eventually to the path computation part, indicating current occupancy level in terms of bandwidth of its interfaces. At the path computation part, the indication is used to update the virtual links of the network model. If the further node sends a similar advert to the node, this is passed on by the node, eventually reaches the path computation engine and again is used to update the virtual links of the network model.

When a traffic request is received, and if the request has a specified bandwidth and quality of service, then it may be appropriate to allow only links which have at least that bandwidth and quality of service available. The quality of service might be expressed in terms of reliability, availability of recovery by protection or restoration, delay parameters such as maximum delay or delay variation, and so on. A graph search algorithm such as Dijkstra or other known algorithm can be applied to compare the costs of alternative links to find a lowest cost path to nodes successively further away from a starting node, until the destination node is reached. Other algorithms can include peer to peer type routing algorithms for example. The links leading to a given node can be regarded as a portion of a possible path. The selected lowest cost path through the virtual links of the model, is converted into a path list in terms of actual nodes and ports and any aggregation information suitable for the actual network. This path can now be set up in the network, by sending the path information to the ingress node for it to send messages along the path as described above for the RSVP protocol for example. This can involve sending a first message to the nodes requesting they reserve resources, and then a second message is returned from the egress node requesting the reserved resources be used to set up the path. Of course this can be implemented in other ways using other protocols.

Figure 14:
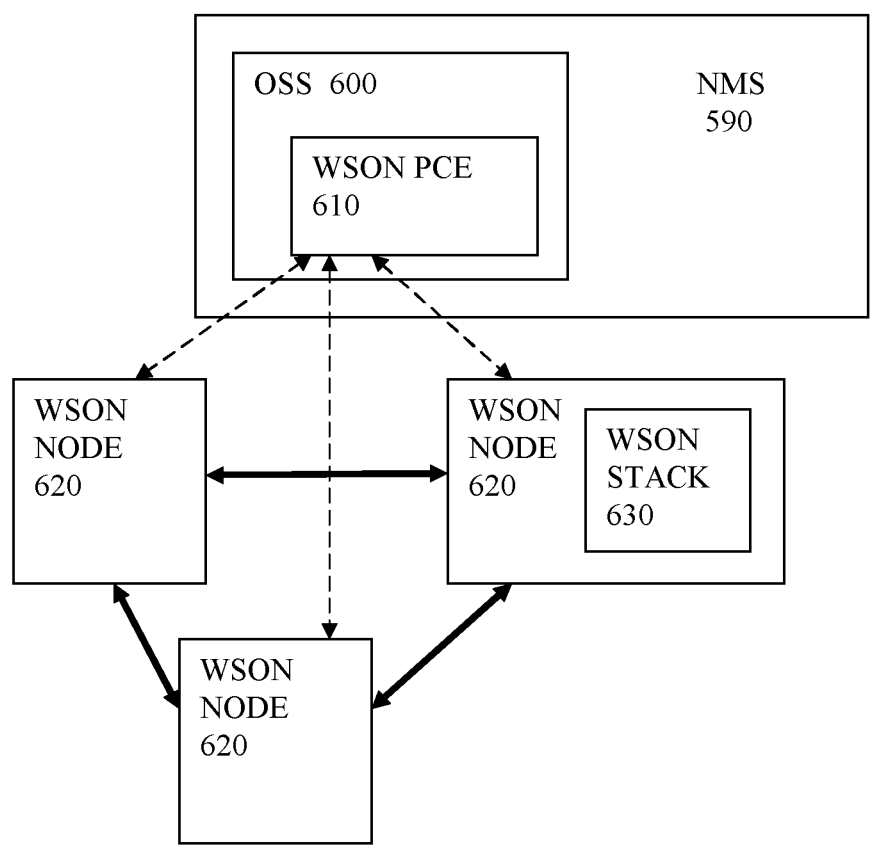
FIG. 14 shows application to a WSON with centralised NMS

FIG. 14, Application to a WSON with Centralised NMS

Ericsson, in its WSON implementations, has moved from a pre-planned control plane (WSON 1.0) to a centralized dynamic one (WSON 2.0) based on real time Path Conputation Element (PCE) engine located into the Network Management System (NMS). This technological upgrade adds the capability to perform an On-The-Fly (OTF) calculation of restoration paths.

In FIG. 14, parts of a centralised dynamic WSON network are shown. There are three WSON nodes 620 shown, there can be many more. A centralised NMS 590 has an OSS 600, and a WSON PCE 610. Each WSON node has a WSON stack 630, of layers of software for carrying out various functions arranged in a hierarchy, shown in only one node for the sake of clarity. The control plane is effectively centralised. There is two way real time communication between the nodes and the centralised OSS and NMS. The OSS can be made more reliable by providing a redundant backup OSS. The WSON stack in each node can carry out the functions of the LSR path reservation control as shown in FIG. 12 and as described with respect to FIG. 13.

In embodiments having the restoration controlled centrally by the OSS at the NMS, the NMS is kept aligned with the status of the resources of the network with traditional alarm reporting and traps generated by the WSON stack of each node. Being advised of each problem at each layer of the photonic network means that the restoration control in the NMS is able to identify circuits that need OTF rerouting.

Embodiments of the current invention can be based on the WSON 2.0 network landscape, but the application field is not limited to these types of implementation but also includes many other network scenarios. It includes but is not limited to those where a centralized control plane is present.

CONCLUDING REMARKS

Often customer requirements on recovery cannot be met with pre-planned only protection or with on the fly only restoration, but with a proper and hybrid combination of pre-planned and on the fly paths and mechanisms it is possible to meet all those requirements more efficiently.

With the Lifeboat approach explained above, the preplanned recovery becomes a defence "of last resort": the OTF scheme is preferred if it can be found and set up within a well defined time limit.

With a proper dimensioning of this time limit, then typical requirements on restoration time and restoration reliability can both be satisfied. If necessary, the requirement on network working path reusage can be met later on with a reoptimization of the OTF path in a time frame where the DCN is not overloaded and the path computation can be performed in a safe environment. To obtain the same advantages using a distributed control plane, three drawbacks are often present:
1) high number of crank-backs due to distributed path computation
2) impossibility of global priorities management
3) need for flooding the network with a lot of physical impairments information for the distributed path computation.

Hence in WDM networks the "Lifeboat" procedure, applied to a centralized dynamic architecture, will tend to perform better than when used in a distributed architecture, though of course the lifeboat procedure can be used in distributed architectures.

Other variations and embodiments can be envisaged within the claims.

The invention claimed is:

1. A method of recovering from failure of a working path for communications traffic in a connection-oriented network, wherein the working path has a preplanned recovery path, the method comprising steps of:
    initiating recovery in response to the failure by requesting computation of a new recovery path for the communications traffic to avoid the failure; and
    determining if the recovery is not successful within a time limit, and then initiating recovery using the pre-planned recovery path,
    wherein the steps of determining if the recovery is not successful and initiating the recovery using the pre-planned recovery path are carried out by a node in the connection-oriented network or by a centralised recovery management part.

2. The method according to claim 1 wherein the steps of determining if the recovery is not successful and initiating the recovery using the preplanned recovery path are carried out by an ingress node of the working path.

3. The method according to claim 1, wherein the step of requesting computation of the new recovery path comprises sending a request to a centralised path computation element and the method further comprises the step of carrying out the computation of the new recovery path at the centralised path computation element.

4. The method according to claim 1, further comprising a step of adapting the time limit during operation.

5. The method of claim 4, further comprising the step of adapting the time limit automatically according to a current status of the network.

6. The method according to claim 1, wherein the preplanned recovery path is arranged to use resources shared with other paths.

7. The method according to claim 6 further comprising a step of checking if the shared resources are still available, and if not, then requesting a new preplanned recovery path.

8. The method according to claim 1, wherein the steps of determining if the recovery is not successful and initiating the recovery using the preplanned recovery path are carried out by a centralised recovery management part.

9. The method according to claim 1, wherein the step of requesting computation of the new recovery path comprises sending a request to a local path computation element at an ingress node of the working path and the method further comprises a step of carrying out the computation of the new recovery path at the local path computation element.

10. A node for a connection-oriented network, wherein the network being arranged to recover from failure of a working path for communications traffic in the network, wherein the working path has a preplanned recovery path, the node comprising:
    a recovery control part configured to initiate recovery in the connection-oriented network in response to the failure by requesting computation of a new recovery path for the communications traffic to avoid the failure; and
    a timer configured to determine if the recovery is not successful within a time limit, wherein the recovery control part is configured to respond to an output from the timer to initiate recovery in the connection-oriented network using the preplanned recovery path,
    wherein the node is configured to interact with one or more other nodes of the connection-oriented network.

11. The node according to claim 10 wherein the node is an ingress node of the working path.

12. The node according to claim 10 configured to request computation by sending a request to a centralised path computation element and configured to receive an indication of the new recovery path from the centralised path computation element.

13. The node according to claim 10, the timer being arranged such that the time limit is adaptable during operation.

14. The node according to claim 10, the preplanned recovery path being arranged to use resources shared with other preplanned recovery paths and the recovery control part being configured to check if the shared resources are still available, and if not, then request a new preplanned recovery path.

15. The node of claim 10, further comprising a local path computation element, and the recovery control part being configured to request computation by sending a request to the local path computation element for computation of the new recovery path.

16. A centralised recovery management part for a connection-oriented network, the network being arranged to recover from failure of a working path for communications traffic in the network, wherein the working path has a preplanned recovery path, and the centralised recovery management part comprising:
    a centralised control part configured to initiate a recovery in the connection-oriented network in response to the failure by carrying out a computation of the new recovery path to avoid the failure; and
    a centralised timer part to determine if the recovery is not successful within a time limit, wherein the centralised control part is configured to respond to an output from the centralised timer to initiate the recovery in the connection-oriented network using the preplanned recovery path,
    wherein the centralised recovery management part is configured to interact with one or more nodes of the connection-oriented network.

17. A nontransitory computer readable medium comprising a computer program comprising machine-readable instructions which when executed by a processor cause the processor to perform a method of recovering from failure of a working path for communications traffic in a connection-oriented network, wherein the working path has a pre-planned recovery path, the method comprising:
  initiating recovery in response to the failure by requesting computation of a new recovery path for the communications traffic to avoid the failure; and
  determining if the recovery is not successful within a time limit, and then initiating recovery using the pre-planned recovery path,
  wherein the processor is part of a node in the connection-oriented network or part of a centralised recovery management part.

* * * * *